Patented Oct. 31, 1950

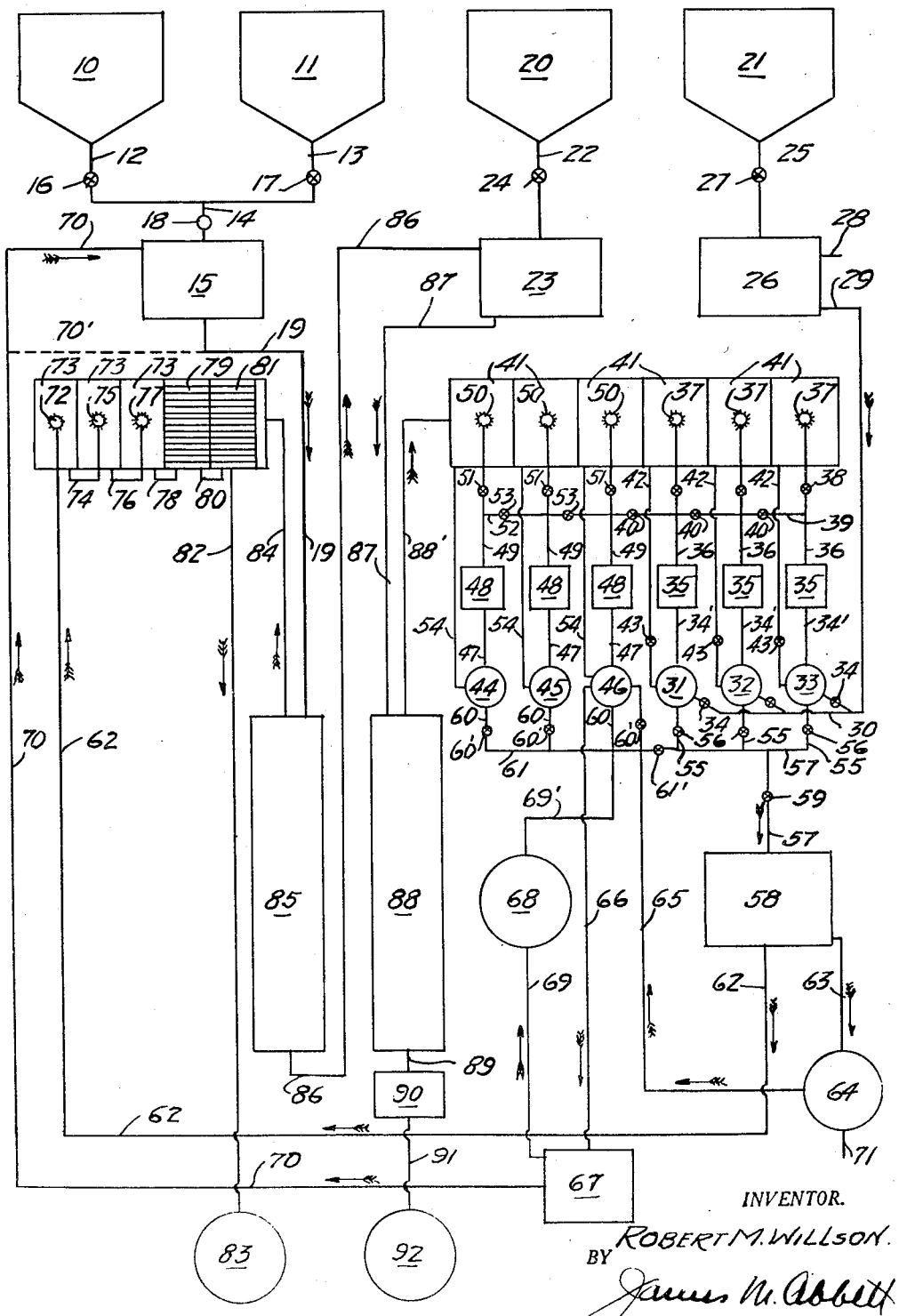

2,528,103

UNITED STATES PATENT OFFICE 2,528,103

METHOD OF PRODUCING SULFURIC ACID AND HYDRAULIC CEMENT FROM GYPSUM

Robert M. Willson, Victorville, Calif.

Application January 7, 1946, Serial No. 639,610

5 Claims. (Cl. 23—167)

This invention relates to the art of commercial chemistry, and particularly pertains to a combined cyclic method of producing sulphuric acid, phosphoric acid, and hydraulic cement.

It is a well established fact that the treatment of phosphate rock with sulphuric acid produces a product containing from fifteen to twenty percent of soluble $P_2O_5$, commercially known as superphosphate. It is also well known that if the rock were treated with dilute sulphuric acid and then filtered, the filtrate would contain phosphoric acid, which can be concentrated by heat, and the residue would contain the calcium sulphate (gypsum variety) formed by the action of the sulphuric acid on the contained calcium of the rock. The residue will also contain silica, clay, and very small amounts of other minerals which exist as impurities.

It is also well known that calcium sulphate (gypsum variety) contains fifty-seven percent sulphuric acid combined with lime (CaO) and water, and that the anhydride and anhydrite products contain approximately sixty percent of sulphur trioxide ($SO_3$). It is obvious that if any cheap method could be developed to liberate the sulphur trioxide from the calcium sulphate then the sulphur trioxide could be made into sulphuric acid ($H_2SO_4$). The sulphuric acid could be combined with phosphate rock and phosphoric acid ($H_3PO_4$) could be produced.

In 1886 U. S. Patent No. 342,785 was issued to Cummins for a method of making sulphuric acid by using a mixture of gypsum and clay in the proportions of a Portland cement composition. Cummins also received U. S. Patent No. 342,784 concerned with a method of making cement by the same procedure. In all of the years since 1886 there is no record of the making of sulphuric acid or cement according to the teachings of Cummins, and my experiments have shown that only a very small amount of sulphur trioxide is liberated by this method. I have found also that by the method disclosed in Cummins Patent No. 342,784 it is not possible to make Portland cement, and that the method is not feasible. (Attention is called to the fact that Portland cement specifications require that the sulphur trioxide content must not exceed two percent.)

It is the principal object of this invention to produce sulphuric acid and phosphoric acid cheaply by a new process involving relatively simple apparatus and incident to the operation of the process to produce an appreciable amount of hydraulic cement, namely Portland cement, either white or grey, as well as so-called high alumina hydraulic cements.

In practicing my new invention I contemplate the treatment of argillaceous materials free from alkalies and gypsum anhydride or anhydrite and carbonaceous materials. The carbonaceous material is preferably coke and I may use catalyzers in the coke, which are naturally in the coal before it is coked or which are added to the coal before it is coked. Such catalyzers consist of silica, iron oxide, aluminum oxide, vanadium compounds, clay, bauxite, and others. The principal idea in the use of a catalyzer is to place minute particles of catalyzer uniformly throughout the mixture, and to maintain it in this condition until a critical temperature is reached, at which time combination occurs between the CaO of the $CaSO_4$ compound and the other ingredients of silica, etc. In considering the combination of these oxides, $SiO_2$ plus others with CaO, it must be remembered that molecular contact is a necessary condition for every chemical reaction, and that to insure complete reaction between solids it is necessary to reduce the particle size to as fine a state as possible, and to mix the materials thoroughly.

The invention is illustrated by way of example in the accompanying drawing in which the figure is a flow plan showing one arrangement of apparatus by which the invention may be practised.

Referring more particularly to the drawing, 10 indicates a storage bin within which argillaceous materials are stored, such for example as silicon dioxide ($SiO_2$), aluminum oxide ($Al_2O_3$), or ferric oxide ($Fe_2O_3$). A storage bin 11 is provided within which gypsum ($CaSO_4.2H_2O$) may be stored. A draw-off pipe 12 is connected to the bin 10, and a draw-off pipe 13 is connected to the bin 11. These pipes lead to a common feed pipe 14 connected with a grinding mill 15 within which the material is reduced to a degree of preferred fineness of minus 200 (—200) mesh. A valve 16 is disposed in the pipe 12 and a valve 17 is disposed in the pipe 13. These valves regulate the flow of material from the two bins in the approximate proportion of one part of silica or clay to 7.5 parts gypsum. A cut-off valve 18 is disposed in the line 14 and is used to simultaneously interrupt flow from both bins to the grinding mill. This will establish cyclic performance of the plant as hereinafter described. A conduit 19 leads from the grinding mill to parts to be hereinafter described.

In addition to the bins 10 and 11 a coke bin 20 is provided containing coke and a catalyzer, and a phosphate rock bin 21 is provided which contains crushed phosphate rock having the general content of seventy percent calcium phosphate and thirty percent clay. The material from the bin 20 is drawn off through a conduit 22 to a grinding mill 23, where it is reduced to a degree of fineness of substantially —200 mesh. A valve 24 is placed in the line 22 to control the quantity of coke and catalyzer being fed to the mill. At the bottom of the bin 21 is a conduit 25 leading to a grinding mill 26. A valve 27 controls the flow of materials from the bin 21 to the mill 26. A suitable amount of water is introduced into the mill 26 through a supply pipe 28. The mill 26 has a draw-off pipe 29 at its bottom through which the ground phosphate rock of a fineness of −200 mesh and water is drawn off in the form of a thin slurry. The draw-off pipe connects with a distributor pipe 30 which leads to a series of storage tanks 31, 32 and 33. Valves 34 are provided between the pipe 30 and each of the storage tanks so that the slurry flowing through the pipe 29 may be delivered into any one of the storage tanks 31, 32 or 33. Pipes 34' are connected to each of the storage tanks and lead to pumps 35. Each of these pumps is fitted with a pipe 36 at the outer end of which is a spray head 37, and at the inner end of which is a control valve 38. The pipes 36 are interconnected with pipes 39 which carry cut-off valves 40. This makes it possible for slurry from the storage tanks 31, 32 and 33 to be delivered to any one of the spray heads 37. The spray heads are mounted in flue chambers 41, a number of which are arranged in series. Return pipes 42 lead from each of the flue chambers 41 to their respective storage tanks 31, 32 and 33 and are controlled by valves 43 so that the material may be sprayed into a particular flue chamber and may be drawn back into the same storage tank in cyclic operation if desired. It is to be understood that the material within the storage tanks 31, 32 and 33 is ground phosphate rock and water, and that the phosphoric acid will also be produced.

In the drawing three spray chambers 41 are shown as receiving slurry from the phosphate rock mill. Three other chambers are shown in series therewith which are supplied with storage tanks 44, 45 and 46, respectively. These tanks are each fitted with a supply pipe 47 leading to a pump 48. The pump in turn is fitted with a pipe 49 leading to a spray head 50, one of which pipes and spray heads is within each of the first three flue chambers 41. Valves 51 are provided in the pipe lines 49 and interconnecting pipes 52 are disposed between the pipes 49 and receive cut-off valves 53. Return pipes 54 lead from the various flue chambers to their respective storage tanks 44, 45 and 46. Thus, weak sulphuric acid may be re-circulated through the storage tank 44 and the first flue chamber, or any arrangement of circulation may take place in the first three flue chambers and the storage tanks 44, 45 and 46, which tanks are for receiving sulphuric acid. The storage tanks 31, 32 and 33 are fitted with draw-off pipes 55 and valves 56. These pipes connect with a pipe 57 which leads to a filter 58. A cut-off valve 59 is in the line of the pipe 57.

The storage tanks 44, 45 and 46 are fitted with draw-off pipes 60 which are controlled by valves 60'. These interconnect the storage tanks 44, 45 and 46 through a pipe 61, and also connect with pipe 57 through a control valve 61'. In the filter 58 phosphoric acid is separated from residue gypsum and clay, and a phosphoric acid draw-off pipe 62 is connected with the filter. A residue draw-off pipe 63 connects with the filter and leads to a flotation or sedimentation cell 64. A pipe 65 carries the clay and gypsum to pipe 60 and the clay treating and sulphuric acid storage tank 46. The mixture of sulphuric acid, clay and gypsum is withdrawn through a pipe 66 leading to a filter 67. The filter 67 connects with a storage tank 68 through a pipe 69 within which sulphuric acid and dissolved sulphates are stored for further treatment. A return pipe 69' connects tanks 46 and 68. A pipe 70 leading from the filter 67 conducts gypsum and clay for the making of cement to the grinding mill 15. When the process is in complete cycle, as will be hereinafter described, the valve 18 is closed so that the cement-making materials delivered through the pipe 70 will flow in closed cycle, and it will not be necessary to use materials from bins 10 and 11 or to supply sulphuric acid from any outside source.

It should be explained that the flotation or sedimentation cell 64 separates approximately 15% of the clay through a waste pipe 71, and that the remaining material, which is a cement mixture comprising gypsum and clay, is led through the pipe 65 to the clay treating and sulphuric acid storage unit 46.

The weak solution of phosphoric acid drawn from the filter 58 through the pipe 62 is led to a spray head 72. This spray head is within one of a series of three flue chambers 73 connected with a kiln to be hereinafter described. The concentrated liquid from the first of the flue chambers 73 will be withdrawn through a pipe 74 and delivered to a spray head 75 in the next succeeding flue chamber. A pipe 76 will withdraw the concentrated liquid from the second flue chamber and deliver it to a spray head 77 in the third flue chamber. The liquid will then be withdrawn from the third flue chamber through a pipe 78 and will be delivered to a waste heat evaporator unit 79. It is then withdrawn through a pipe 80 and delivered to a second evaporating unit 81, after which it is finally withdrawn through a pipe 82 and delivered as concentrated phosphoric acid to a tank 83. It is to be understood that the flue chambers 73 and the waste heat evaporators 79 and 81 receive flue gas through a conduit 84 connected to a first operation kiln 85. This kiln is heated by a suitable source of fuel supply to a temperature of the order of 1800°–3000° F. Into this kiln is delivered the mixture of silica and clay which was ground in the grinding mill 15 and which passes into the kiln through the conduit 19. At the opposite end of the kiln 85 from that to which conduit 19 connects is a suitable conveying conduit 86 through which a clinkered mixture of $SiO_2$ and gypsum are delivered to the grinding mill 23. In this mill this material will mix with the coke and catalyzing agent supplied to the mill from the bin 20. These materials, as previously explained, are reduced to a fineness of −200 mesh. They are then delivered through a conduit 87 to a second operation kiln 88. Within this kiln cement clinker will be produced which is delivered by a conduit or conveyor 89 to a cement mill 90. After it has been ground it is delivered through a conduit 91 to a cement storage unit 92. Within kiln 88 $SO_3$ gas will be produced which is delivered to the flue chambers 41, previously described, through conduit 88'.

In carrying out the steps of the present invention with the apparatus of the general construction as described in the foregoing portion of the specification, the operation is described as follows: In the first step of the process, material is drawn from bins 10 and 11 in approximately the proportion of 7.5 parts by weight of gypsum or anhydride to one part by weight of silica or the aforementioned silica combinations with the other oxides, and it is preferred to grind these materials very fine to a mesh of the order of −200. To accomplish this and to obtain a better mixture a bin of the mixture is first ground dry, after which another part of the mixture is ground into a slurry, wet enough to give maximum fineness. To this slurry is added some of the dry ground materials so as to reduce the moisture content and to pug it. These materials may also be made into briquettes or forced through dies and nodulized, or may be made into pellets. This mixture in any desired form is then fed into rotary kiln 85 within which it is preferable to use an oxidizing flame so as to reduce to a minimum any reduction or dissociation of the calcium sulphate. This mixture is burned to a point of incipient fusion which greatly reduces it in size and of course increases the specific gravity of the product desirably. The particles of silica oxide, aluminum oxide and calcium sulphate cling to each other and are discharged as solid clinkers.

When any forms of gypsum containing water travel down the kiln they are all changed to the anhydride form. Then all of the combined water is expelled before any chemical reaction with silica compounds takes place, so that either gypsum, anhydrite, or gypsum anhydride can be used. It is preferable to feed wet or moist materials from the mill 15 into the kiln 85 to insure that there will be less kiln dust in the flue chamber. However, a dry mix may be used if desired.

It is to be understood that the kilns 85 and 88 mentioned herein may be either rotary or stationary in type, although present-day rotary cement kilns seem to be preferable.

The clinkered mixture of $SiO_2$ and gypsum which was withdrawn from kiln 85 through conduit 86 is reground with a small amount of hard burned coke which contains a catalyzer and is withdrawn from the storage bin 20. This grinding operation is performed in the mill 23. It has been found that two percent or less of the material taken from the bin 20 and mixed with the material drawn from the kiln is sufficient for proper operation. This mixture of material is then ground in mill 23 in the same way as previously described, a part of the material being wet and part of the material being dry, after which the product may be nodulized or briquetted. The wetting, briquetting, pelleting, or nodulizing of the material drawn from the mill 23 not only keeps down the feed dust in the flue chambers 41 of the kiln 88 but the amount of fine ground coke with its included catalyzer will be more evenly distributed and will be held in place better by this compacting, thus accelerating any chemical reactions which take place. It will be recognized that the finely divided coke drawn from bin 20 and ground with the clinker from kiln 85 in the grinding mill 23 will be uniformly distributed through the mass. This insures that particles of coke will be burned out of the ground product whether briquetted or pelleted or delivered loose from the grinding mill 23 to the kiln 88, with the result that the structure of the preferred pellets or ground clinker will be foraminous and that the ash from the burned coke will remain within the foramina. Thus, this ash or any other catalyzer used will be distributed uniformly throughout the mass for subsequent action.

These nodules, pellets, or briquettes are fed into the kiln 88, where the carbon within the coke combines with the excess oxygen occurring in the upper end of the kiln to form carbon-dioxide gas. The material at this point within the kiln is at a low red heat and is foraminous in structure. The foramina contain a small amount of natural catalyzer ($SiO_2$, $Al_2O_3$, $Fe_2O_3$) from the ash in the coal, or from the catalyzer which is added when the coal is coked, so that when the clinkering temperature is reached a good grade of cement will be made. This clinkering temperature is preferably of the order of 1800°–3000° F. The sulphur trioxide which is driven off from the kiln 88 is delivered to the flue chambers 41 and is converted into sulphuric acid by washing in the flue chambers with water and sulphuric acid sprays, and is also concentrated by the heat from the flue gases from the kiln.

The gas from kiln 85 will always contain some sulphur dioxide ($SO_2$) gas derived from the sulphur contained in the fuel used in burning. The same result will be obtained in kiln 88. It may also be that some of the gas ($SO_3$) liberated from the gypsum in either kiln may dissociate into $SO_2+O$ (sulphur dioxide plus oxygen), due to the reducing action of the fuel before the excess oxygen can prevent it. If it is found that this action takes place an appreciable amount of coke may be placed in any one of the flue chambers 41 to convert the sulphur dioxide into sulphur trioxide. It will be recognized that the coke will act as a catalyzer agent, and that if desired any other catalyzer may be used for the same purpose. The washing of the gases with sulphuric acid containing water within the flue chambers 41 will produce a sulphuric acid wash, which in the presence of free oxygen will convert some sulphur dioxide into trioxide. It is recommended that the fuel be burned in the presence of sufficient oxygen so as to create an excess of oxygen in the flue gases by a safe margin in order to reduce to a minimum any reduction action resulting from the fuel used or from the coke used in the kiln 88.

If a clay in bin 10 is used with the gypsum in bin 11, or is mixed with the silica, it must first be digested with sulphuric acid (preferably hot). This decomposes the contained feldspars and takes practically all of the alkalies, iron, alumina, lime, and magnesia, into solution. It is then filtered or decanted and the residue only is used. If a feldspar high in potash is used and is digested with the acid the filtrate is fed into a separate kiln (not shown in the drawing), which drives off the sulphuric acid from the potassium aluminum sulphate. This is then recovered in the flue chambers 41. The kiln output is digested with water and is filtered within a separate filter not shown in the drawing. Aluminum oxide is removed from the filter and is delivered to a storage tank from which it is returned to the circuit as needed to increase the aluminum oxide content in making the cement mixture with the gypsum and the acid washed phosphate residue. The alkalies, sodium and potassium, are the most active fluxes, and if there is any appreciable amount of either of these present the mixture will melt; in fact, even after these materials are reground and reburned with the coke the oxides of sulphur will not be liberated in sufficient quantities to make a good grade of cement. The oxides of calcium and magnesium also act as fluxes when they exist as silicates and interfere with the liberation of the sulphur oxide gases. Just what percentage of the above ingredients may be allowed to remain in order to obtain the best results must be determined by the reactions of the various materials used. With the gypsum, experiments have been made by using pure Ottwa standard testing sand alone, and different clays have been washed with sulphuric acid to which has been added iron oxide and aluminum oxide. These have made cements with the CaO content varying from 61.5 to 69.0 percent. White cement and grey cement have been made in which the SO₃ content was reduced to below one percent; in fact, this content has been reduced as low as 0.15 percent. The cement clinker made from limestone carries from 0.10 percent to 2 percent SO₃ according to the fuel and raw materials used in making.

In some instances it may be desirable to substitute barium or strontium sulphate for calcium sulphate when other qualities of cement are desired, such as cement which is acid-resistant. It is obvious that silicates of barium and strontium may also be made for industrial purposes when desired.

Attention is directed to the fact that the making of a good grade of cement is very important in the present process since the financial return from the same will offset the cost of making sulphuric acid in this process.

The second major step in the present process is the manufacture of phosphoric acid. It is the general practice to use high grade phosphate rock which contains approximately seventy percent calcium phosphate and thirty percent clay and other materials. If a high grade phosphate material above 85% calcium phosphate content is used sufficient silicious material will not be present for the making of a good grade of cement. In that event silica and clay from an outside source may be added to the material within the bin 21. The CaO content of the 70% calcium phosphate rock amounts to about 50%. If the clay content of 30% were reduced about one-half, to approximately 15%, the lime and the clay would make a good grade of cement mixture. It should be pointed out that all deposits of phosphate rock which are found in sufficient quantities in nature for use in a process of the present type are not generally richer than 73% calcium phosphate. If this rock were used in the present process the product would contain an objectionably large amount of argillaceous material so that a good cement clinker would not be produced. It is desirable, therefore, to perform the process known as "benefiting the rock" in which a suitable proportion of argillaceous material is removed by such systems as flotation and sedimentation. In the present process phosphate rock is pulverized, after which enough of the clay is removed by flotation or sedimentation to give the required proportion. This operation may take place before the phosphate rock is treated with sulphuric acid or afterwards. The treatment of the phosphate rock with the sulphuric acid provides gypsum which may be used with part of the clay recovered from the phosphate rock in making additional sulphuric acid. The proportion of the clay which is to be used in making cement does not have to be separated from the phosphate rock but is treated with the sulphuric acid simultaneously with the treatment of the phosphate rock. If desired additional gypsum obtained from an outside source may be added to counterbalance any proportion of clay in the phosphate rock. This is desirable when making a cement mixture if it is found that the normal clay proportion (30%) associated with the phosphate rock cannot be successfully removed.

The materials which are drawn from the bin 21 and ground with water in the mill 26 are then delivered through the pipes 29 and 30 to the storage tanks 31, 32 and 33, and then to the flue chambers 41. Sulphuric acid can be collected wholly or partly by water and sulphuric acid sprays in the flue chambers and may be added to the phosphate rock, or the phosphate rock can be ground into a slurry and sprayed into the flue chambers through the spray heads 37. It will be understood that the flue chambers 41 contain SO₃ gas. The phosphoric acid is either concentrated in the flue chambers of kiln 85 or in evaporators 81 using flue gas from the first kiln 85. The gases from the first kiln 85 are used for this purpose because these gases contain a lesser amount of the sulphuric acid and sulphur dioxide fumes, and therefore, will not be so destructive to the flues.

In the treatment of phosphate rock with sulphuric acid by the present method it is preferable to grind the phosphate rock to a fineness of $-200$ mesh. After the rock has been ground in mill 26 a weak solution of sulphuric acid is added to circulate with the ground rock and to create a thin slurry. The sulphuric acid content is then increased in strength until all of the phosphate rock is decomposed. This operation can be accomplished by recirculating the material through the storage tanks 31, 32 and 33, and the spray heads 37 to their respective flue chambers 41, or when the various valves 43, 53, 55 and 56 are manipulated the material in the storage tanks 31, 32 and 33, as well as the storage tanks 44, 45 and 46, may be recirculated through the flue chambers 41 in any desired cycle of operation, and sulphuric acid may be delivered to the tanks 31, 32 and 33 when the valve 61' is open. The phosphoric acid can be separated at this point and concentrated as described if it is desired to maintain a very pure grade of phosphoric acid. The residue containing gypsum and clay can be treated with stronger sulphuric acid to purify the clay and eliminate alkalies, as previously described. The same action can be accomplished by spraying the phosphate rock into the flue chambers 41 of kiln 88. These chambers contain sulphur trioxide gas and fumes. It is preferable to begin the spraying operation in the chamber 41 which is the farthest from the kiln 88 and then introduce the phosphate rock slurry into the next succeeding flue chambers and storage tanks in succession. By following this practice it will be recognized that the phosphate rock slurry is first washed with a weak solution of sulphuric acid, and that the acid increases in strength progressively through the process. This insures that the gypsum and phosphate rock will be separated in a manner to free the raw material from alkalies which would cause the mixture to melt too rapidly, and also to keep the gypsum free from impurities, notably the phosphorous compounds which are objectionable in large quantities. When this takes place a practical separation of sulphuric acid is not possible in the making of good cement.

Summarizing the foregoing description, it will be found that by the use of silica or clay plus oxides and gypsum, or a gypsum anhydride or an anhydrite, it is possible to obtain sulphuric acid and cement as separate commercial products. The reactions are as follows:

$$CaSO_4 \cdot 2H_2O \text{ plus heat} = CaSO_4 + 2H_2O.$$

$$CaSO_4 \text{(anhydride)} = CaO + SO_3.$$

Silica+oxides=$SiO_2+Al_2O_3+Fe_2O_3$ plus small amount of manganese, titanium, and other oxides contained in silicious materials.

$$(SiO+Al_2O_3+Fe_2O_3)+(CaO+SO_3) = \\ (3CaO.SiO_2+2CaO.SiO_2+3CaO.Al_2O_3+ \\ 4CaO.Al_2O_3.Fe_2O_3)+SO_3$$

This product is Portland cement clinker. In addition there will be obtained $SO_3+H_2O=H_2SO_4$ (sulphuric acid). As a result of these reactions the marketable products will be sulphuric acid and cement, and it would be necessary to obtain the materials for manufacture from outside sources. When phosphate rock is added to the sulphuric acid a rock is selected which is approximately 30% clay and 70% calcium phosphate. The reaction after the phosphate rock is beneficiated to contain 15% of clay will be as follows:

$Ca_3(PO_4)_2+3H_2SO_4+6H_2O+15\%$ clay$=$
$3CaSO_4.2H_2O+2H_3PO_4+15\%$ clay
$SiO_2+3CaO+3SO_3+6H_2O=$Cement$+3H_2SO_4$.

From the foregoing reaction the marketable product obtained would be phosphoric acid and cement. From these reactions it will also be seen that the only raw material necessary to produce the phosphoric acid and cement is phosphate rock and coke containing a catalyzer, and that during this process sulphuric acid is made, used and regenerated. It will also be noted that the process can be initiated by purchasing sulphuric acid on the market or by producing sulphuric acid from silica plus various oxides and gypsum. In practising the invention it has been found that if gypsum obtained by the action of the sulphuric acid or phosphate rock contains some included calcium phosphate, this does no harm, but seems to accelerate the process and probably acts as an additional catalyzer, as it is believed that calcium phosphate remains inert in cement clinker. The calcium phosphate makes the cement clinker set slower, but this is a previously well established fact. In the treatment of phosphate rock by the present method the included $P_2O_5$ content in the gypsum clay residue can be reduced to one-tenth of one percent.

Aluminum oxide and potassium sulphate can also be made by a selection of materials as previously described. It is also to be noted that the reduction of the raw phosphate rock to a fine state and its subsequent treatment with sulphuric acid produces finer products of gypsum and clay than can be made by grinding the natural raw materials. This fine particle size is very essential to the process, as previously stated.

It is also to be understood that while coke has been described as a desirable ingredient to introduce into kiln 88 that other materials may be be used, such as any carbonaceous substance which when burned in kiln 88 is capable of holding and leaving a catalyzer in the voids produced by the burning of the carbon.

The kilns 85 and 88 may be fired either by the use of carbon compounds as fuel or by the use of electricity, and regardless of the kind of heat used, the raw material must be greatly reduced in size by heat and then reground with coke or other material containing the catalyzer before the final burn in the kiln to obtain the best result, which is the dissociation of calcium sulphate into lime and sulphur gases. It will also be understood that carbonaceous materials with catalyzers may be mixed or ground with materials fed to both kilns 85 and 88, and that more than two kilns may be used in carrying out the procedure hereinbefore described when obstinate mixes are treated.

In the drawing as shown and the procedure described no coke or catalyzer is added with the material fed to the first kiln, as it was found possible with certain mixes and flame conditions to put them through the kiln to the point of incipient fusion without liberating any or at least a very small percentage of the $SO_3$ from the calcium sulphate, which is a very desirable procedure in order to evaporate cheaply the large amount of water from the weak phosphoric acid by direct contact of sprays with the hot flue gases. Any small amount of sulphuric acid which is collected with the phosphoric acid can be combined with limestone and converted into gypsum, which is a well established practice in purifying phosphoric acid, and the gypsum added back into the raw cement mixture. Also, the gases of the first kiln 85 can be washed in the first flue chamber with the same thin phosphate slurry as used in the chambers 41 of the second kiln 88 and returned to the second kiln flue system 41, if sufficient $SO_3$ is driven off of the mixture in kiln 85 to warrant this procedure.

It is also to be noted that one flue chamber can be used for one or several kilns if the evaporating of the filtered phosphoric acid is done in a series of vacuum evaporators where it does not come in direct contact with the flue gases.

In the use of catalyzers I do not limit the invention to coal coke. They may exist naturally in petroleum coke or be added to the petroleum before the petroleum coke is made; they may be added to the raw mix before each burn as solids, liquids or gases. They may exist naturally in the raw argillaceous materials, the calcium sulphates or the phosphate rock, or they may be added with any carbonaceous material to perform the same function which the coke does.

The present process can also be employed in making sulphuric acid or phosphoric acid by using a greater amount of silica or clay constituents with the gypsum, and making a product in kiln 88 with less lime than the compound dicalcium silicate $(2CaO.SiO_2)$, which compound is considered to be the lowest limit in lime (CaO) for Portland cement.

It will thus be seen that by the method and apparatus here disclosed it is possible to make sulphuric acid and phosphoric acid cheaply in a new continuous process, and that at the same time an appreciable amount of hydraulic cement may be produced.

While I have disclosed the preferred steps of the method of practising my invention and a suitable apparatus to be used therewith, it is to be understood that various changes may be made in the steps of the method and in the combination of parts of the apparatus, by those skilled in the art, without departing from the spirit of the invention as claimed.

Having thus described my invention, what I claim and desire to secure by Letters Patent is:

1. A method of making sulphuric acid which consists in preparing finely ground acid-washed argillaceous materials, mixing the same with finely ground gypsum in proportions to produce cement clinker, subjecting the mixture to heat in an oxidizing atmosphere until the particle size is materially reduced and a clinker is formed, thereafter adding carbonaceous material containing a catalyzing material consisting of the mineral components present in coal and coal ash to said clinker, regrinding this mixture, subjecting this mixture to heat in an oxidizing atmosphere to produce a cement clinker and to free sulphur oxide gases substantially in the form of sulfur trioxide and treating the gases to form sulphuric acid.

2. A method of producing sulphuric acid which consists in preparing finely ground acid-washed argillaceous materials, mixing the argillaceous materials with finely ground gypsum anhydride in proportions to thereafter produce cement clinker, subjecting the mixture to heat of the order of 2500° F. in an oxidizing atmosphere until the particle size is reduced and a clinker is formed, thereafter adding carbonaceous material containing a catalyzing material consisting of the mineral components present in coal and coal ash to said clinker, regrinding this mixture, compressing the mixture into pellets, subjecting the pellets to heat of the order of 2500° F. in an oxidizing atmosphere to produce a cement clinker and to free sulphur oxide gases substantially in the form of sulfur trioxide and treating the gases to form sulphuric acid.

3. A method of making sulphuric acid which consists in preparing finely ground acid-washed argillaceous materials, mixing the same with finely ground gypsum in proportions to produce cement clinker, subjecting the mixture to heat in an oxidizing atmosphere until the particle size is materially reduced and a clinker is formed, thereafter adding carbonaceous material and a catalyzing material consisting of the mineral components present in coal and coal ash to said clinker, regrinding this mixture, forming pellets of the mixture, subjecting the pellets to heat in an oxidizing atmosphere to liberate the carbon dioxide gases and thus form voids in the pellets, liberating the sulphur oxide gases in the form of sulfur trioxide, removing the liberated gases, recovering the residue in the form of cement clinker, recovering the gases and converting the same to sulphuric acid.

4. A method of producing sulphuric acid from a mixture of finely ground, substantially alkali free argillaceous material and gypsum having the characteristics of a raw cement mixture, comprising heating the mixture in an oxidizing atmosphere to produce a clinker, removing the clinker thus formed, adding carbonaceous material and a catalyzing material consisting of the mineral components present in coal and coal ash to said clinker to form a second mixture, heating this second mixture in a separate oxidizing atmosphere to liberate the sulphur oxide gases substantially in the form of sulfur trioxide, recovering the gases, recovering the residue in the form of a cement clinker and treating the recovered gases to form sulphuric acid.

5. A method of making sulphuric acid including the steps of treating argillaceous material to remove the alkalis therein, grinding the treated argillaceous material with gypsum to form a mixture, the gypsum present in the mixture being in such quantity that the ratio of the calcium oxide in the mixture to the argillaceous material is substantially the same as that in a raw cement mixture, introducing the finely ground mixture into a heating zone, maintaining an oxidizing atmosphere, in the zone at a temperature to produce incipient fusion of the mixture and thus form clinkers of substantially the same chemical composition as the original mixture, removing the clinkers so produced, adding carbonaceous material and a catalyzing material consisting of the mineral components present in coal and coal ash to said clinker to form a second mixture, grinding the second mixture, compacting the said mixture into the form of pellets, introducing the pellets into another heating zone, maintaining an oxidizing atmosphere in this zone, applying heat to the pellets to burn the carbonaceous material with the excess of oxygen provided by the oxidizing atmosphere thus driving off carbon dioxide and forming voids in the pellets, liberating the sulphur oxide gases substantially in the form of sulfur trioxide, increasing the temperature in this zone to form cement clinker, removing the clinker, recovering the gases and treating the recovered gases to form sulphuric acid.

ROBERT M. WILLSON.

REFERENCES CITED

The following references are of record in the file of this patent:

UNITED STATES PATENTS

| Number | Name | Date |
|---|---|---|
| 1,197,331 | Basset | Sept. 5, 1916 |
| 1,198,816 | Basset | Sept. 19, 1916 |
| 1,244,280 | Basset | Oct. 23, 1917 |
| 1,251,741 | Blumenberg | Jan. 1, 1918 |
| 1,413,048 | Matheson | Apr. 18, 1922 |
| 1,570,353 | Jacobson | Jan. 19, 1926 |
| 1,790,023 | Rothe | Jan. 27, 1931 |

FOREIGN PATENTS

| Number | Country | Date |
|---|---|---|
| 309,298 | Great Britain | Apr. 11, 1929 |
| 309,604 | Great Britain | Apr. 12, 1929 |
| 404,991 | Great Britain | Jan. 23, 1934 |

OTHER REFERENCES

Budnikoff: "Concrete" (Mill Section), vol. 43, 1935 No. 3, pages 40–2; No. 4, pages 38–41; No. 5, pages 39–40.

Lamor et al.: "Rock Products," vol. 46, No. 7, 1943, page 59.